M. C. SCHWEINERT.
WATER BOTTLE STOPPER.
APPLICATION FILED AUG. 27, 1915.

1,382,679.

Patented June 28, 1921.

WITNESSES:

INVENTOR:
Maximilian Charles Schweinert,
By Attorneys,

UNITED STATES PATENT OFFICE.

MAXIMILIAN CHARLES SCHWEINERT, OF WEST HOBOKEN, NEW JERSEY.

WATER-BOTTLE STOPPER.

1,382,679.     Specification of Letters Patent.     Patented June 28, 1921.

Application filed August 27, 1915. Serial No. 47,606.

*To all whom it may concern:*

Be it known that I, MAXIMILIAN CHARLES SCHWEINERT, a citizen of the United States, residing at West Hoboken, in the county of Hudson and State of New Jersey, have invented certain new and useful Improvements in Water-Bottle Stoppers, of which the following is a specification.

This invention relates to stoppers for hot water bottles or the like.

Such stoppers are commonly made of metal and screw into a metal thimble. A rubber packing or gasket is interposed, being commonly fastened to the inner end of the stopper so as to bear against an inturned flange or seat in the metal thimble. Considerable pressure is required in screwing in the stopper to make a water-tight joint, and as the screwthreads are pressed up from sheet metal so that they have a rounding contour, the threads when screwed tightly together are liable to wedge or bind so that it is very difficult to unscrew the stopper. The present invention aims to improve the stopper in such manner that a tight joint can be made without screwing the stopper in so hard as heretofore. To this end the packing or gasket is placed at the upper or outer part of the stopper instead of at its inner end. The gasket is also made by preference conical and fits within a cone formed in the upper or outer part of the thimble. The gasket is cured or vulcanized in place on the stopper so that it adheres thereto and its seating face is molded in curing and is cured to a firmness or approximate hardness such that it is not subject to a material deformation in use.

Figure 1 of the accompanying drawings shows in section the mouth portion of a water bottle with its stopper in place, the stopper being shown in elevation and the gasket in section;

Figure 1:
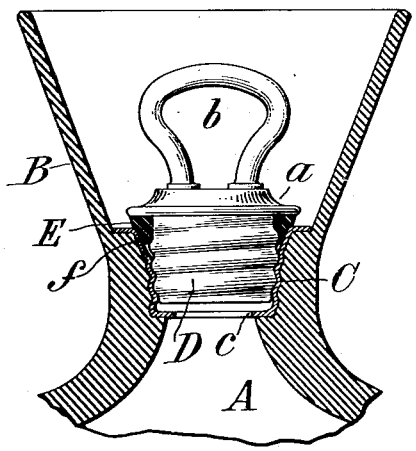
Figure 3:
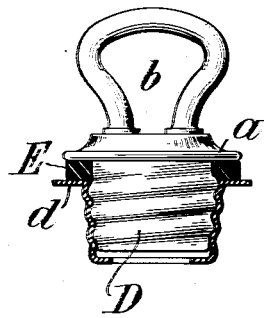
Fig. 3 is a section similar to Fig. 1 but showing a modified construction.
Figure 2:
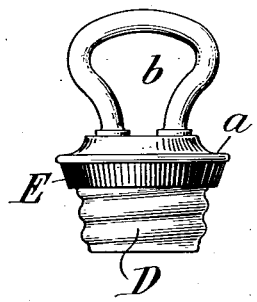
Fig. 2 is an elevation of the stopper with its gasket.

In the drawings, A is the water bottle, of rubber, having the usual flaring mouth B, and having vulcanized into its neck portion a metal thimble C having pressed screwthreads. Into this screws a stopper D which is drawn up in the usual manner of sheet metal and has pressed screwthreads. It has also the usual upper flange $a$ and handle $b$. The rubber gasket E instead of being fastened to the lower end of the stopper and engaging a seat formed on an inturned flange $c$, is formed as a ring encircling the stopper just beneath its flange $a$. While this gasket might be of washer shape so as to have parallel top and bottom faces as shown in Fig. 3, its lower face seating against a flat portion $d$ of the thimble, yet it is preferable to make the gasket conical as shown best in Fig. 2 and to form the thimble with a coned upper portion $f$, Fig. 1, having the same taper as the coned face of the gasket, so that as the stopper is screwed down the coned gasket is forced into the coned seat. This coning of the parts makes a water-tight joint without requiring to screw the stopper in so tight as heretofore.

Heretofore the gasket has been made of a separate disk or ring of rubber fastened either to the stopper or to the thimble, but without being cured to either. The gasket E is cured or vulcanized after being put in place on the stopper. During this curing it is confined in a mold which gives the desired true and accurate conical face to the exterior of the gasket. The curing operation cements the gasket faces to the metal, so that the stopper cannot slip within the gasket in tightening it. The curing in a mold leaves the outer or packing face of the gasket smooth and polished, so that it more readily turns against the metal seat. The gasket not having to be stretched to put it in place, does not require the amount of elasticity heretofore necessary, and hence may be cured to a much greater firmness or approximate hardness such that in forcing it into place it is not liable to any appreciable deformation. The gasket is however sufficiently compressible to make a tight joint, which requires but very slight compression if its metal seat be true; and especially is this the case with a conical form of seat and gasket.

Figure 4:
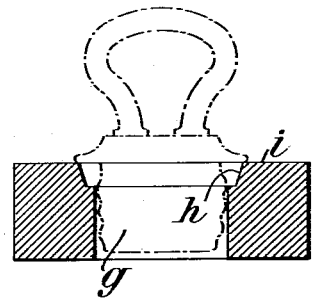
Fig. 4 is a cross-section of a mold in which the gasket is cured.

Fig. 4 is a cross-section of a suitable mold in which to vulcanize the gasket, the tubular portion $g$ receiving the threaded shank of the stopper, the conical portion $h$ giving shape to the gasket while the flat top $i$ receives the flange $a$.

The invention may be modified to some extent without departing from its essential features hereinafter specified as will be apparent.

I claim as my invention:—

5. A metal stopper having a rubber gasket adherent to it and of such firmness as to be free from substantial deformation in use.

In witness whereof, I have hereunto signed my name in the presence of two subscribing witnesses.

MAXIMILIAN CHARLES SCHWEINERT.

Witnesses:
JOHN MORRIS,
FRED WHITE.